United States Patent [19]

Young

[11] Patent Number: 5,721,659
[45] Date of Patent: Feb. 24, 1998

[54] APPARATUS FOR PROTECTING ELECTRICAL AND ELECTRONIC EQUIPMENT AND ASSOCIATED METHOD

[75] Inventor: Danny J. Young, Plant City, Fla.

[73] Assignee: Rabun Labs, Inc., Plant City, Fla.

[21] Appl. No.: 635,169

[22] Filed: Apr. 25, 1996

[51] Int. Cl.$^6$ ................................................ H02H 3/22
[52] U.S. Cl. .................................... 361/111; 361/118
[58] Field of Search ............................... 361/111, 119, 361/56, 91, 117

[56] References Cited

U.S. PATENT DOCUMENTS

| | | | |
|---|---|---|---|
| 3,753,117 | 8/1973 | Downing et al. | 325/364 |
| 4,016,428 | 4/1977 | Gutterman | 307/116 |
| 4,095,262 | 6/1978 | St. Clair | 361/1 |
| 4,276,576 | 6/1981 | Uman et al. | 361/1 |
| 4,493,975 | 1/1985 | Yamamoto | 219/370 |
| 4,550,273 | 10/1985 | Boettcher et al. | 315/151 |
| 4,782,355 | 11/1988 | Sakai et al. | 354/400 |
| 4,835,650 | 5/1989 | Epstein | 361/56 |
| 5,291,208 | 3/1994 | Young | 342/198 |

Primary Examiner—Jeffrey A. Gaffin
Assistant Examiner—Sally C. Medley
Attorney, Agent, or Firm—Allen, Dyer, Doppelt, Milbrath & Gilchrist, P.A.

[57] ABSTRACT

A protection apparatus includes a relay being switchable between a protected state and an operating state, a power consumption sensor, and a controller for permitting a user to switch the relay to the operating state, and for switching the relay to the protected state responsive to sensed power consumption of the electrical equipment indicating nonuse thereof. Accordingly, the apparatus protects the electrical equipment from disturbances carried by the external electrical conductors when the electrical equipment is not in use. The apparatus preferably includes a housing which also serves to mount a plurality of electrical connectors for interfacing between the electrical equipment and the external electrical conductors. In one embodiment, the apparatus also preferably includes a lightning sensor for switching the relay to the protected state responsive to sensing of lightning. Alternately, or in addition, the apparatus may also include a power loss sensor for sensing a loss of power from the power source to the electrical equipment and for switching the relay immediately to the protected state responsive to sensing a loss of power.

57 Claims, 4 Drawing Sheets

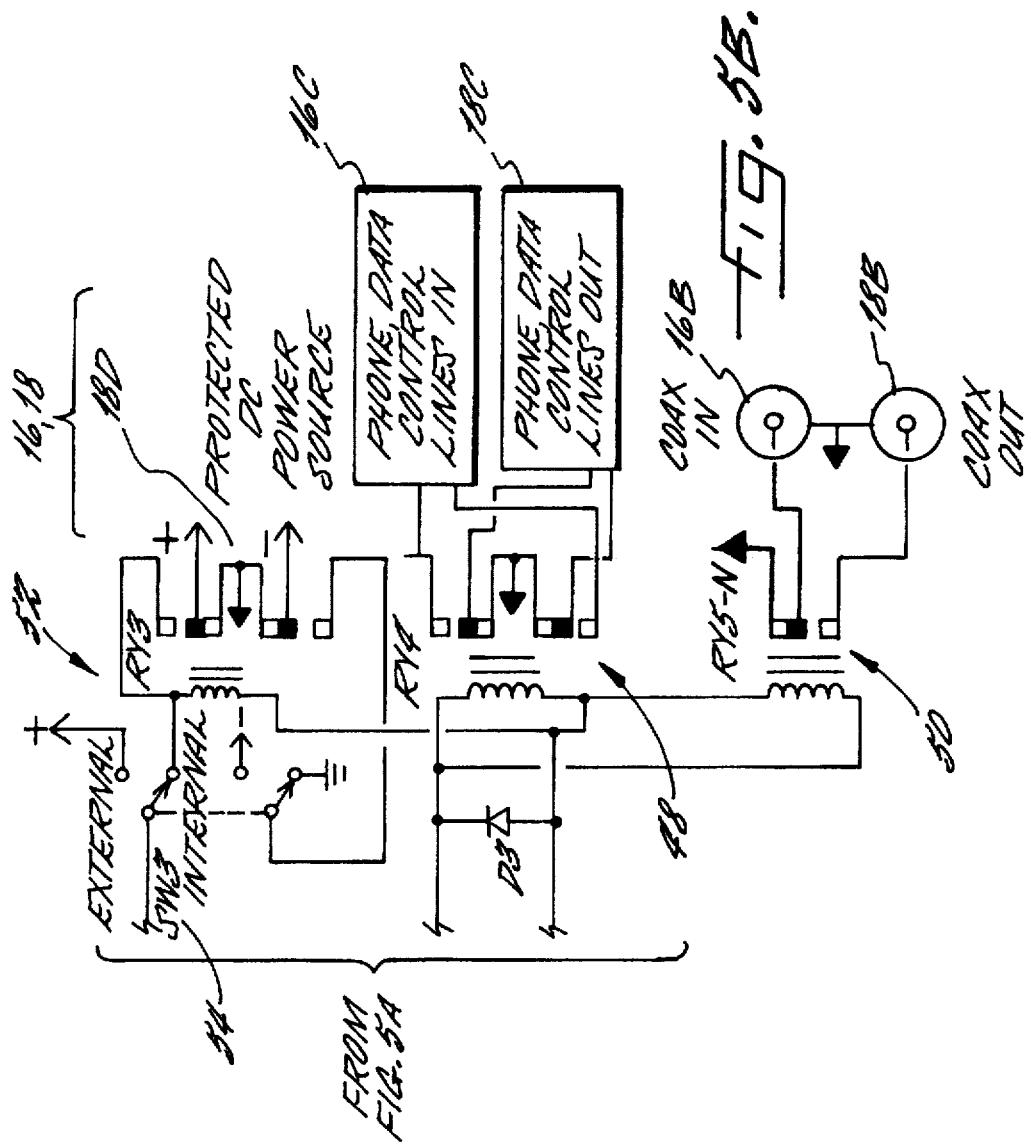

APPARATUS FOR PROTECTING ELECTRICAL AND ELECTRONIC EQUIPMENT AND ASSOCIATED METHOD

FIELD OF INVENTION

The invention relates generally to protection equipment, and more particularly, to an apparatus and method for protecting electrical and electronic equipment from disturbances as may be carried by external conductors connected to the equipment.

BACKGROUND OF THE INVENTION

Many types of electrical and electronic equipment require connections via external conductors to a source of electrical power or other equipment. For example, many devices interface to external conductors, such as for communication over a telephone line, or connection to a remote antenna. Unfortunately, electronic equipment may also experience reduced reliability and even a catastrophic failure caused by surges or other disturbances carried to the equipment by coaxial, telephone, data, control, or power conductors connected to electronic equipment and its associated circuitry.

The disturbances are typically in the form of voltage and/or current spikes or surges that may result from transients on the power conductors, for example, caused by the switching on and off of large electrical loads sharing the power line. Irregularities in the power delivered by the utility company supplying the power may also cause potentially damaging disturbances. Lightning related surges may also be coupled to sensitive electronic equipment via external conductors. In addition, current surges caused by power system faults may also damage electrical and electronic equipment.

Many types of arresters, isolation transformers, and suppressors have been used in an attempt to provide protection from power line disturbances and lightning induced disturbances carried by external conductors. Conventional suppression devices typically do not provide a sufficient response time or have the energy dissipation capacity to adequately protect many types of electrical and electronic equipment. In other words, conventional protection devices may not provide a level of isolation and/or grounding necessary to fully protect the equipment to which they are connected.

One particularly difficult situation for conventional protection devices occurs from a ground potential rise caused by nearby lightning. Conventional protection devices may be ineffective against such a ground potential rise. Moreover, a common protection scheme is to connect the equipment to electrical ground, thus subjecting the equipment to the potentially damaging rising ground potential.

Some common types of protection devices are also turned off when the electronic equipment itself is not in use. Unfortunately, the electronic equipment is still subject to damage because of its external conductors are still connected and these conductors may carry potentially damaging electrical disturbances. Many types of conductors may carry undesirable disturbances including, for example, power, coaxial, telephone, data, and low voltage control lines.

It is often recommended that certain more sensitive electronic devices, such as a computer, a VCR, or a television, for example, be unplugged or disconnected from external conductors during extended periods of non-use or particularly when a lightning storm is forecast. Such methods while potentially effective if rigorously followed are usually inconvenient, impractical, or forgotten. Typically, one simply forgets to disconnect the electronic equipment.

U.S. Pat. No. 4,095,262 to St. Clair, for example, is directed to protecting household appliances, such as a TV, for example, from high voltages as may be caused by lightning. The apparatus includes a plurality of manually operated switches which may be connected for common operation. Accordingly, a user may manually switch the connections to isolate the equipment side conductors from the line and connect them to the chassis ground for protection. Unfortunately, the user must still remember and take the time to manually operate the switches prior to and after each use.

By way of further example, U.S. Pat. No. 4,276,576 to Uman et al. is directed to lightning protection of electronic or electrical equipment wherein the electronic equipment is moved to a protected state responsive to detection of nearby lightning or detection of a power outage. U.S. Pat. No. 5,291,208 to the present inventor, and assigned to the assignee of the present invention, describes a significant improvement in the area of lightning detection and equipment protection. These types of protection devices must first detect lightning or another disturbance before moving the electronic equipment to a protected state. Accordingly, accuracy and speed of detection are desirably combined with rapid switching to protect the equipment against lightning related disturbances.

SUMMARY OF INVENTION

In view of the foregoing background, it is therefore an object of the invention to provide an apparatus and associated method for protecting electrical and electronic equipment against potentially damaging disturbances carried to the equipment by external electrical conductors.

This and other objects, advantages and features of the present invention are provided by a protection apparatus for protecting electrical and electronic equipment comprising switching means being switchable between a protected state and an operating state; power consumption sensing means for sensing electrical power consumption of the electrical equipment; and control means for permitting a user to switch the switching means to the operating state, and for switching the switching means to the protected state responsive to sensed power consumption of the electrical equipment indicating nonuse thereof. Accordingly, the apparatus protects the electrical equipment from disturbances carried by the external electrical conductors when the electrical equipment is not in use. For simplicity, the term electrical equipment is used to refer to both sensitive electronic equipment, as well as electrical equipment having little or no electronics.

In particular, the switching means when in the protected state isolates equipment sides of the external electrical conductors from respective line sides of the external electrical conductors. Conversely, the switching means when in the operating state connects line sides of the external electrical conductors to respective equipment sides of the external electrical conductors. The apparatus preferably includes a housing which also serves to mount a plurality of electrical connectors for interfacing with the electrical equipment and downstream external conductors. For example, the plurality of electrical connectors may comprise at least one of an AC power connector, a DC power connector, a coaxial cable connector, a telephone line connector, and a data connector.

In one embodiment, the apparatus also preferably includes lightning sensing means for switching the switching means to the protected state responsive to sensing of lightning. Alternately, or in addition, the apparatus may also include power loss sensing means for sensing a loss of power from the power source and for switching the switching means immediately to the protected state responsive to sensing a loss of power. In other words, protection is provided against other events or occurrences capable of causing a potentially damaging surge or disturbance to be carried by the external conductors to the electrical equipment.

Another aspect of the invention is that the switching means preferably comprises shunting means for shunting equipment sides of the external conductors together in the protected state. In one embodiment, the switching means may comprise ground isolating means for isolating shunted equipment sides of the external conductors from an external ground electrical conductor. Accordingly, the equipment is protected from the particularly troublesome ground potential rise that would otherwise be carried to the equipment via the ground conductor. In another embodiment, the switching means further comprises ground connecting means for connecting shunted equipment sides of the external electrical conductors to the external ground electrical conductor.

The control means also preferably includes start-up timer means for switching the switching means to the protected state a predetermined time after the switching means is initially switched to the operating state and responsive to sensed power consumption indicating that the electrical equipment has not yet been turned on thus defining a start-up operating state for the protection apparatus. Accordingly, the user has sufficient time to turn on the electrical equipment, but if he forgets or fails to do so, the apparatus will time out and switch to the protected state.

Start-up indicator means may be provided for indicating to the user whether the protection apparatus is in the start-up operating state. In addition, state indicator means may be carried by the housing for providing an indication of whether the switching means is in the protected state or the operating state.

The protection apparatus may be initially moved to the operating state in several different ways. For example, the control means may comprise a manually operable switch carried by the housing for permitting a user to initially switch the switching means to the operating state. Alternately, or in addition thereto, a remote control unit may be carried by the user. Accordingly, the control means thus preferably further comprises a receiver for receiving a signal from the remote control unit for permitting the user to initially switch the switching means to the operating state. The remote control unit may preferably be a wireless hand held transmitter of the type as commonly used for the control of home entertainment equipment, for example.

The power consumption sensing means may be an electrical current sensor coupled to the external electrical connectors providing power to the electrical equipment from the electrical power source. In addition, the electrical current sensor may be provided in part by a toroidal coil coupled to the AC power line.

A method aspect of the present invention is for protecting electrical equipment from an electrical disturbance carried by external electrical conductors connecting the electrical equipment to at least a source of electrical power. The method preferably comprises electrically connecting switching means to the external electrical conductors with the switching means being switchable between a protected state and an operating state. The switching means when in the protected state isolates equipment sides of the external electrical conductors from respective line sides of the external electrical conductors, and when in the operating state connects line sides of the external electrical conductors to respective equipment sides of the external electrical conductors.

The method also preferably includes the steps of sensing electrical power consumption of the electrical equipment, permitting a user to initially switch the switching means to the operating state, and switching the switching means to the protected state responsive to sensed power consumption of the electrical equipment indicating nonuse thereof. Accordingly, the electrical equipment is protected from disturbances carried by the external electrical conductors when the electrical equipment is not in use.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited the embodiments set forth herein. Rather, these embodiments are provided so that this disclosure will be thorough and complete, and will fully convey the scope of the invention to those skilled in the art. Like numbers refer to like elements throughout.

Figure 1:
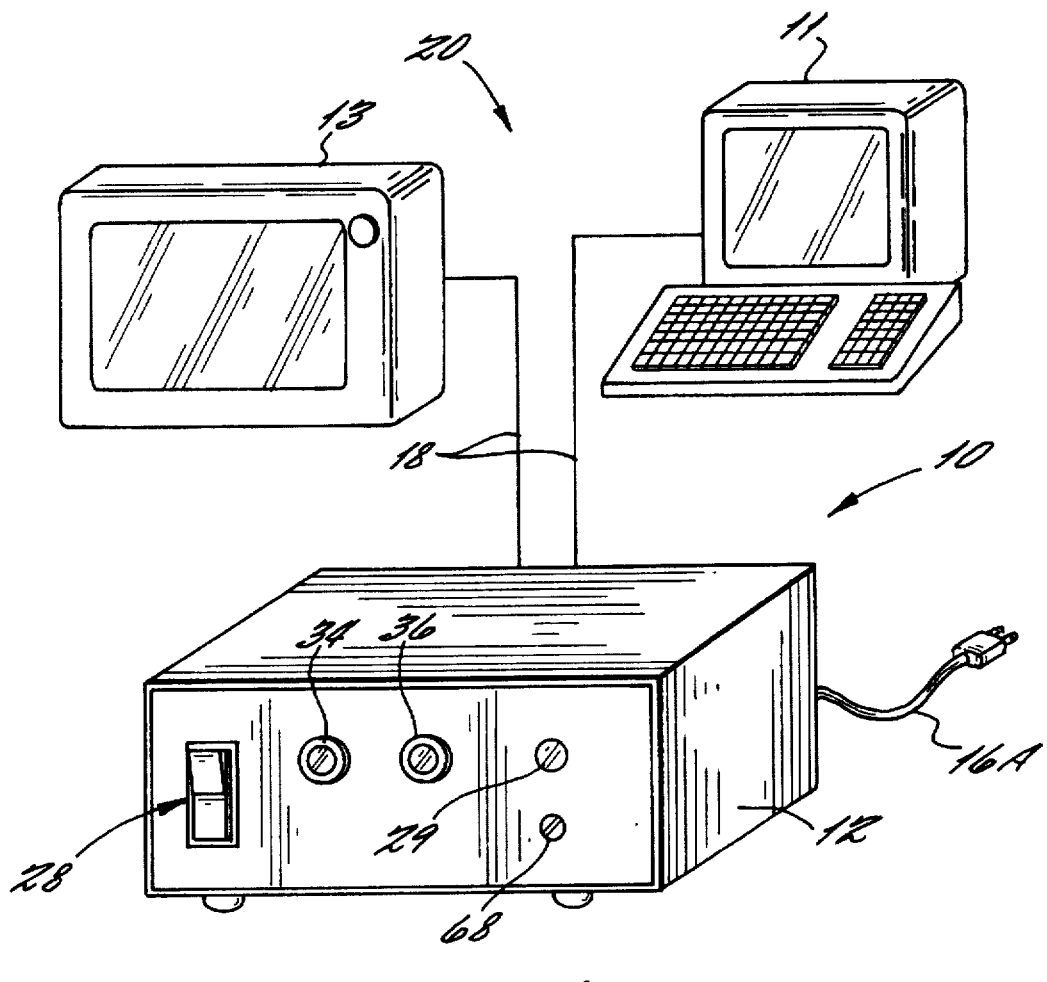
FIG. 1 is a front perspective view of the protection apparatus of the present invention coupled to a personal computer and a television.
Figure 2:
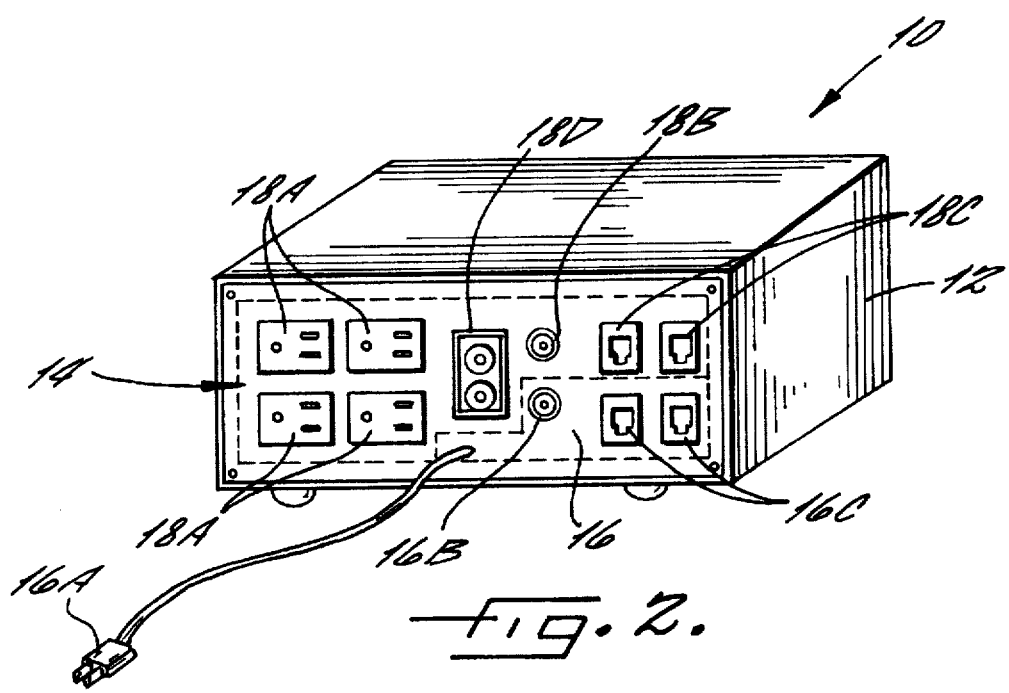
FIG. 2 is a rear perspective view of the apparatus of the present invention.
Figure 3:
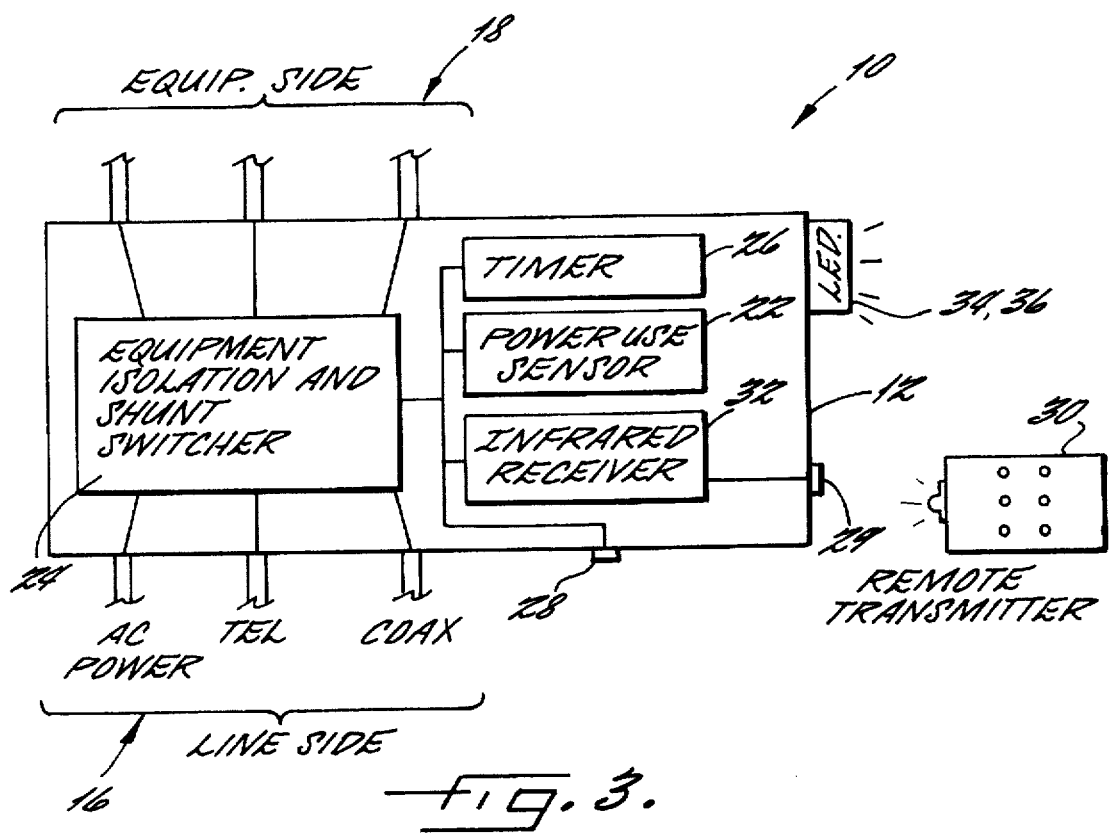
FIG. 3 is a functional block diagram of the apparatus further illustrating a remote transmitter.

Referring now initially to FIGS. 1-3, an electrical equipment protection apparatus 10 in accordance with the present invention is first described. The protection apparatus 10 comprises a housing 12 for containing the components and for mounting a plurality of electrical connectors 14 which, in turn, establish connections to the line side 16 and equipment side 18 of various external electrical conductors. Such external electrical conductors are commonly used for electrical equipment 20, such as the illustrated personal computer 11 and television receiver 13, for example, as would be readily understood by those skilled in the art.

Referring more particularly to FIG. 3, a power use or power consumption sensor 22 is positioned within the housing 12 for sensing power consumption of the electrical equipment 20. Power consumption by the electrical equipment 20 indicates that the equipment is in use, while if the power consumption sensed were zero, the equipment would typically not be in use and would be turned off. Switching means provided by the schematically illustrated switcher 24 is also positioned within the housing 12 and is responsive to the power consumption sensor 22. The switcher 24 connects line sides of the external conductors 16 to equipment sides of the external conductors 18 when the apparatus 10 is in the operating mode. Accordingly, power and other connections are established and maintained to operate the electrical equipment 20 when in the operating mode.

When sensed power consumption indicates that the electrical equipment 20 is not being used, the switcher 24 disconnects the line and equipment sides of the external conductors so that the apparatus 10 is in a protected state or mode with the electrical equipment being isolated to the external conductors. Accordingly, electrical disturbances or surges, such as from lightning or power system faults, cannot be coupled from the electrical equipment 20 via the external conductors.

The electrical equipment 20 may be powered from the protection apparatus 10 through the illustrated AC power cord 16A. In addition, coaxial connectors 16B, and modem and telephone jacks 16C, and/or a DC connector 16D may also be provided, carried by the housing 12, and operatively coupled to the switcher 24.

To initially switch the apparatus 10 to the operating mode a timer 26 is initially triggered by depressing the manually operable switch 28, for example. The timer 26 maintains the switcher 24 in the operating state even though the electrical equipment 20 has not yet been turned on, and, hence, the current or power sensor 22 is not yet indicating power flow. In other words, the timer 26 defines a start-up operating state for the apparatus. In an alternate embodiment of the invention, a remote infrared transmitter 30 is used to activate the timer 26 through the illustrated infrared receiver 32 which includes an optical detector 29. Infrared remote control transmitters and receivers are widely used in the area of house entertainment component control, as would be readily understood by those skilled in the art. As would also be readily understood by those skilled in the art, other types of wired or wireless remote transmitters may also be used in accordance with the invention.

Figure 5A:
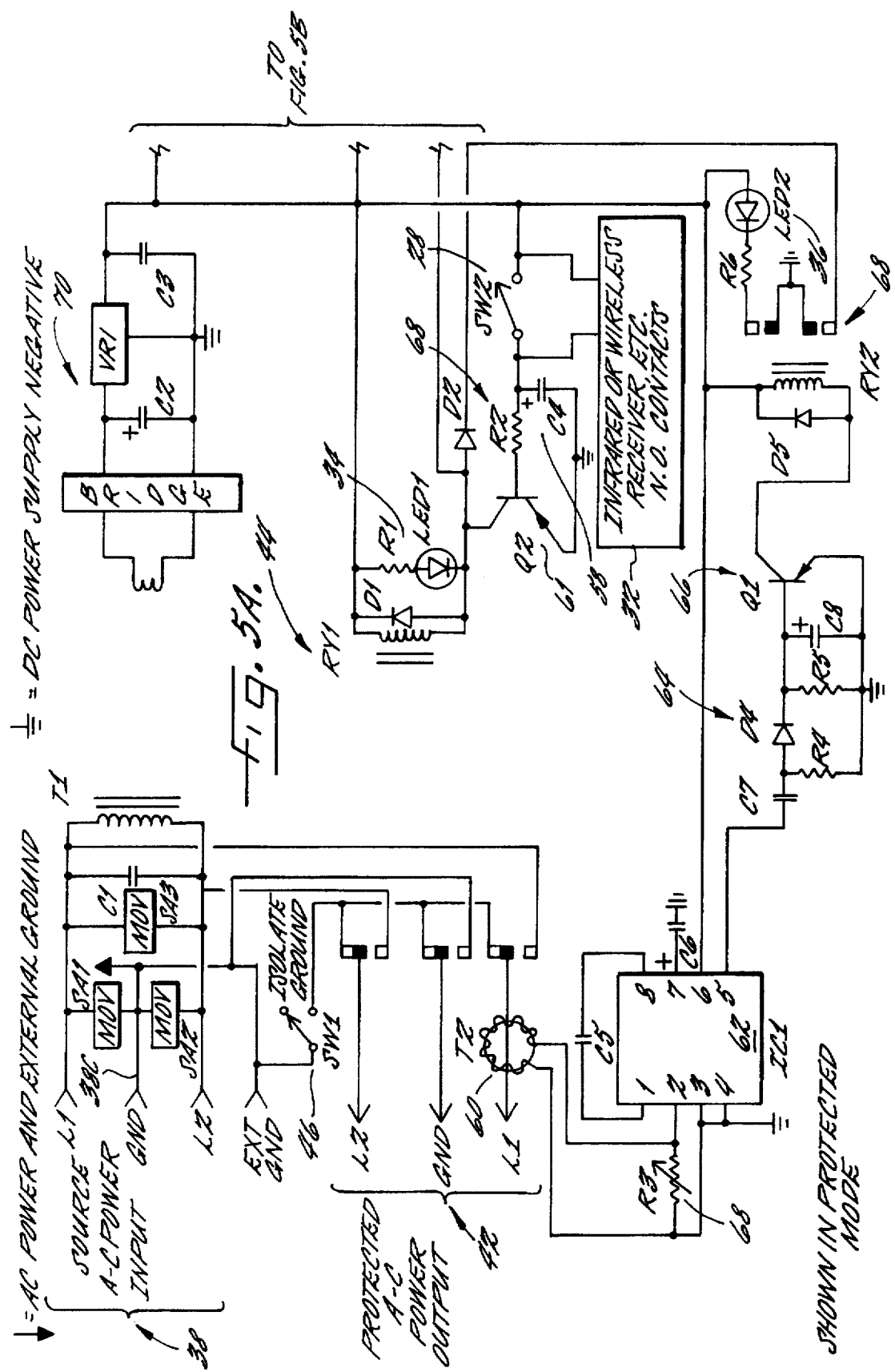
FIG. 5 is a schematic circuit diagram of the apparatus of the present invention.

A first or start-up state LED 34 lights alerting the user, and the user must turn on the connected equipment 20 before the timer 26 times out and the apparatus 10 moves to the protected state with the equipment 20 being disconnected. The timer 26 is typically set for about thirty seconds. Once the equipment 20 is powered up, a second or state indicating LED 36 may be illuminated to indicate the apparatus is in the operating state. The length of the time period may be set by a potentiometer 68 (FIGS. 1 and 5). The power consumption sensor 22, monitors power used by the equipment. If the electrical equipment 20 is turned off, the power sensor 22 will cause the switcher 24 to disconnect the equipment 20. Accordingly, the equipment 20 is protected from potential surges when not in use.

Figure 4:
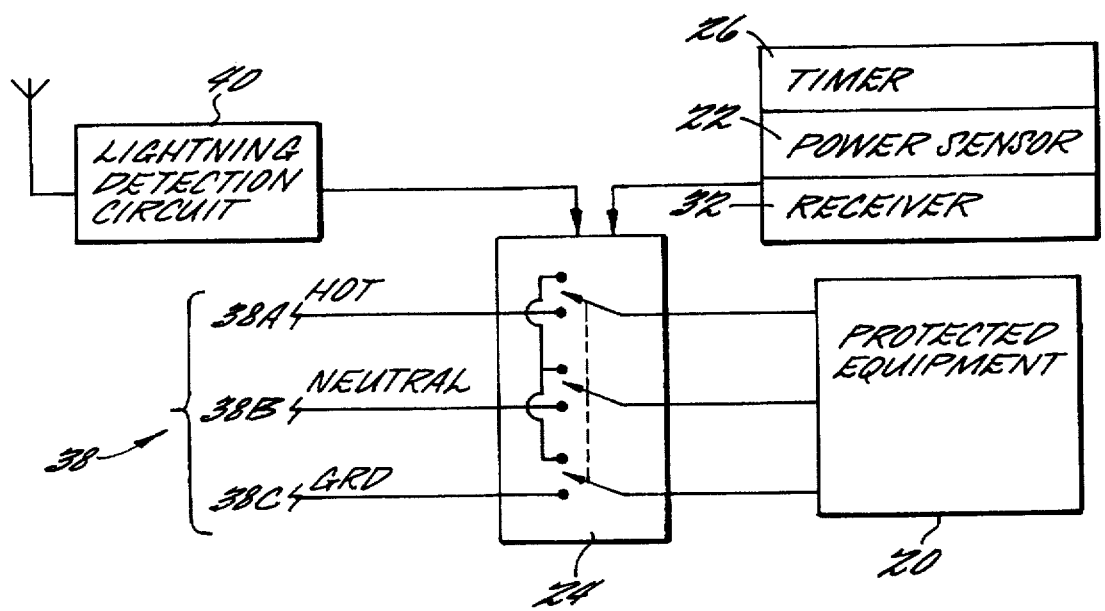
FIG. 4 is a functional block diagram of another embodiment of apparatus including a lightning sensing circuit.

As illustrated with reference to FIG. 4 another aspect of the invention is that the switcher 24 desirably immediately moves to the protected state based upon a loss of power, such as typically delivered via the AC power conductors. In other words, the switcher 24 may comprise a relay coil which drops the relay upon a loss of power supplied to the apparatus 10. Accordingly, the electrical equipment 20 is protected against any surges as may be caused, for example, as an automatic recloser on the utility power system attempts to clear a fault by periodically closing the substation breaker for the faulted line.

Yet another aspect of the invention is that the equipment side of all three AC power conductors, hot 38A, neutral 38B, and ground 38C are isolated from the line side, and the equipment side of the external conductors are shunted together. Conventional protection schemes typically ground all equipment side conductors. However, it has been found that it may be more desirable to leave the equipment conductors floating, or more preferably, to leave the conductors floating and shunt them together as illustrated, by way of example, with reference to FIG. 4. The equipment side of the other external electrical conductors may also be isolated from their respective line sides. Similarly, the equipment sides may be shunted together and left floating from ground. This reduces a likelihood of damage due to a low side surge that is not addressed by conventional protection devices, such as those using an MOV or gas discharge tubes, since these are ground referenced devices.

In other embodiments of the invention, it may be desirable to connect all of the shunted together line sides to an earth ground as would be readily understood by those skilled in the art.

As further illustrated with reference to FIG. 4, the switcher 24 may be driven by a lightning sensor 40 that will also cause the switcher to isolate and shunt together the equipment input and output lines 16, 18 upon the sensing or detection of lightning. For example, U.S. Pat. No. 5,291,208 to the present inventor, and assigned to the assignee of the present invention, describes a receiver and its associated circuitry suitable for detecting the nearby presence of potentially damaging lightning, and the entire disclosure of this patent is incorporated herein by reference in its entirety. Accordingly, the electrical equipment 20 may enjoy yet a further degree of protection from damage based upon nearby lightning causing disturbances or surges on the external electrical conductors. The timer 26, receiver 32, and switch 28 along with associated circuitry described below define control means for moving the switcher 24 between protected and operating states.

Turning now to the circuit schematic diagram of FIG. 5, the apparatus 10 is further described and illustrated in a protected state or mode. A source of AC power is supplied via the power connections 38 as earlier described with reference to FIG. 4 and delivers AC power via conductors 42 to the electrical equipment 20. The source power is supplied or disconnected via relay RY1 designated as numeral 44 which in the preferred embodiment is a 3PDT relay. The relay 44 disconnects and isolates the electrical equipment 20 connected through the power connections 38. Further, this relay isolates the equipment 20 from ground 38C to prevent damage from low side surges, in other words, surges that are predominantly present on the ground conductor 38C, typically from nearby lightning strikes being dissipated into the earth and conducted to equipment ground connections.

As further illustrated with reference to FIG. 5, the protected AC power 42 to the electrical equipment 20 is isolated from the source 38 and lines shunted together to prevent a surge from entering the equipment should the surge arc across a contact gap in the relay 44 when in the protected mode. When in this protected mode, a switch SW1, identified by numeral 46 provides an option of placing the equipment power input 42 at ground potential in addition to isolating and shunting. Again, should the surge jump the gap of the relay 44, the surge would be directed to ground and not to the electrical equipment 20. In typical operation, equipment electrical ground continuity is maintained for safety purposes.

The same methodology of protecting equipment from surges in the power conductors or lines is used for signal lines by the disconnecting, shunting, and/or grounding the external conductors coupled via coax connectors 16B, 18B, telephone and/or data connectors 16C, 18C, and other external conductors in general. When AC power is disconnected, shunting and grounding as earlier described for power are performed for the signal lines in a similar manner using relays RY4 and RY5, identified with numerals 48 and 50, respectively.

Commercial and industrial configurations may be desirable where equipment or components are powered by a DC power source operated in conjunction with the AC powered equipment, such as is in remote located switching and isolating relays. Such a configuration may also benefit from protection provided by the apparatus 10 in accordance with the invention as would be readily understood by those skilled in the art. The relay RY3, numeral 52, provides for such protection where a DC power source is disconnected, isolated, and the equipment side conductors are shunted together to ground, simultaneously with the AC power and other electrical conductors.

In one embodiment of the present invention, provision is made for an external DC power supply via SW3, numeral 54, in the event the internal power supply of the apparatus 10 does not offer the required voltage or current needed. In operation, the electrical equipment 20 is connected to the apparatus 10, as earlier described; switch SW2, numeral 28, is manually operated or remotely controlled, also as earlier described via remote transmission methods. Normally open contacts as illustrated with reference to those described in FIG. 5, are momentarily closed, at which time capacitor C4, numeral 58, is charged causing transistor Q2, numeral 60, to be forward biased. This in turn provides a coil voltage for relays 44, 48, 50, and 52, which connects the equipment 20 to all external electrical conductors or lines (AC & DC power, coax, telephone, data, control, and any others incorporated into the apparatus) and is indicated by an illuminated LED1, numeral 34.

At this point, the electrical equipment 20 is normally turned on for use, and the current draw from the AC power source, or the power consumption of the equipment, is detected, in part, by the toroid transformer T2, numeral 60. The output of the toroid transformer 60 is proportional to the amount of current drawn and is applied to an amplifier 62 which is rectified via circuit 64, and which DC voltage is then applied to the base of transistor Q1, numeral 66. When the voltage adjusted via resistor R3, numeral 69, is applied to the base of the transistor Q1, numeral 66, indicating that the equipment is consuming power, the transistor Q1, is forward biased and relay RY2, numeral 67, is activated, as indicated by LED2 36.

All equipment electrical connections are maintained in the operating position (by the second set of contacts of relay RY2 67) as long as current is sensed by the toroid transformer 60. This condition will remain until the equipment 20 is turned off and current is no longer being drawn, at which time, the relays, as herein described, will automatically switch, disconnecting and isolating electrical connections to some or all external electrical conductors.

As further described with reference to FIG. 5, the apparatus 10 of the present invention has additional built-in safeguards. If equipment 20 is operating and the AC power source is lost, the relays drop out and revert to the disconnected and isolated positions, thus further protecting the equipment 20. In addition, if the switch SW2 28 or the remote controlled normally opened contacts are momentarily closed, but the equipment is not turned on within the predetermined time of approximately thirty seconds, the time constant of R2-C4 circuit 65 will be exceeded and the transistor Q2 61 will no longer be forward biased, thus causing the relays again to drop out and revert to the disconnected or protected state. This situation is particularly valuable where the apparatus 10 was either accidentally activated and the user was not planning to use the equipment, or if the apparatus was activated but the user was interrupted or distracted, thus exposing the electrical equipment 20 to possible damage.

The apparatus 10 in a preferred embodiment herein described provides a level of on-line protection through the three metal oxide varistors (MOV's) arranged in a preferred common-mode configuration 70, wherein noise on the AC line is filtered and attenuated by capacitor C1, prior to being applied to the electrical equipment 20. The apparatus 10 thus provides protection to equipment 20 such as a personal computer, by controlling the AC power and modem telephone line connections 16C, 18C. The apparatus 10 may also be used in a more complex setting in the home where an entertainment system includes AC power, coax and control connections for a TV, am-fm receivers, VCR and CATV or even a satellite receiving system when the equipment is powered-up, but isolates the lines to the equipment 20 when the equipment 20 is not in operation. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A protection apparatus for protecting electrical equipment from an electrical disturbance carried by external electrical conductors connecting the electrical equipment to at least a source of electrical power, said protection apparatus comprising a housing;

connector means carried by said housing for connection with the external electrical conductors;

switching means positioned within said housing and operatively coupled to said connector means and being switchable between a protected state and an operating state, said switching means when in the protected state for isolating an equipment side of the external electrical conductors from a respective line side of the external electrical conductors, said switching means when in the operating state for connecting a line side of the external electrical conductors to a respective equipment side of the external electrical conductors;

power consumption sensing means positioned within said housing for sensing electrical power consumption of the electrical equipment; and switch timing control means, associated with said housing and operatively coupled to said switching means and said power consumption sensing means, for permitting a user to switch said switching means to the operating state, and for switching said switching means to the protected state responsive to sensed power consumption of the electrical equipment indicating nonuse of the electrical equipment to thereby protect the electrical equipment from disturbances carried by the external electrical conductors when the electrical equipment is not in use.

2. A protection apparatus according to claim 1 further comprising lightning sensing means for switching said switching means to the protected state responsive to sensing of lightning.

3. A protection apparatus according to claim 1 further comprising power loss sensing means for sensing a loss of power from the power source and for switching said switching means immediately to the protected state responsive to sensing a loss of power.

4. A protection apparatus according to claim 1 wherein said switching means comprises shunting means for shunting an equipment side of the external electrical conductors together in the protected state.

5. A protection apparatus according to claim 4 wherein the plurality of external electrical conductors includes an external ground electrical conductor; and wherein said switching means further comprises ground isolating means for isolating the shunted equipment side of the external electrical conductors from the external ground electrical conductor.

6. A protection apparatus according to claim 4 wherein the plurality of external electrical conductors includes an external ground electrical conductor; and wherein said switching means further comprises ground connecting means for connecting shunted equipment side of the external electrical conductors to the external ground electrical conductor.

7. A protection apparatus according to claim 1 wherein said switch timing control means further comprises start-up timer means for switching said switching means to the protected state a predetermined time after said switching means is initially switched to the operating state and responsive to sensed power consumption indicating that the electrical equipment has not yet been turned on defining a start-up operating state for the protection apparatus.

8. A protection apparatus according to claim 7 further comprising start-up indicator means carried by said housing for providing an indication of whether the protection apparatus is in the start-up operating state.

9. A protection apparatus according to claim 1 further comprising state indicator means carried by said housing for providing an indication of whether said switching means is in the protected state or the operating state.

10. A protection apparatus according to claim 1 wherein said switch timing control means comprises a manually operable switch carried by said housing for permitting a user to initially switch said switching means to the operating state.

11. A protection apparatus according to claim 1 further comprising a remote control unit to be carried by the user; and wherein said switch timing control means further comprises a receiver within said housing for receiving a signal from said remote control unit for permitting the user to initially switch said switching means to the operating state.

12. A protection apparatus according to claim 11 wherein said remote control unit comprises a wireless hand held transmitter.

13. A protection apparatus according to claim 1 further comprising a plurality of electrical connectors operatively coupled to said switching means and connected to said housing for connectively receiving the external electrical conductors, and wherein said plurality of electrical connectors comprise at least one of an AC power connector, a DC power connector, a coaxial cable connector, a telephone line connector.

14. A protection apparatus according to claim 13 wherein said power consumption sensing means comprises an electrical current sensor coupled to the plurality of electrical connectors providing power to the electrical equipment from the electrical power source.

15. A protection apparatus according to claim 14 wherein said electrical current sensor comprises a toroidal coil.

16. A protection apparatus for protecting electrical equipment from an electrical disturbance carried by external electrical conductors connecting the electrical equipment to at least a source of electrical power, said protection apparatus comprising:

switching means being switchable between a protected state and an operating state, said switching means when in the protected state for isolating an equipment side of the external electrical conductors from a respective line side of the external electrical conductors, said switching means when in the operating state for connecting a line side of the external electrical conductors to a respective equipment side of the external electrical conductors;

power consumption sensing means for sensing electrical power consumption of the electrical equipment; and switch timing control means, operatively coupled to said switching means and said power consumption sensing means, for permitting a user to switch said switching means to the operating state, and for switching said switching means to the protected state responsive to sensed power consumption of the electrical equipment indicating nonuse of the electrical equipment to thereby protect the electrical equipment from disturbances carried by the external electrical conductors when the electrical equipment is not in use.

17. A protection apparatus according to claim 16 further comprising lightning sensing means for switching said switching means to the protected state responsive to sensing of lightning.

18. A protection apparatus according to claim 16 further comprising power loss sensing means for sensing a loss of power from the power source and for switching said switching means immediately to the protected state responsive to sensing a loss of power.

19. A protection apparatus according to claim 16 wherein said switching means comprises shunting means for shunting an equipment side of the external electrical conductors together in the protected state.

20. A protection apparatus according to claim 19 wherein the external electrical conductors include an external ground electrical conductor; and wherein said switching means further comprises ground isolating means for isolating the shunted equipment side of the external electrical conductors from the external ground electrical conductor.

21. A protection apparatus according to claim 19 wherein the external electrical conductors include an external ground electrical conductor; and wherein said switching means further comprises ground connecting means for isolating the shunted equipment side of the external electrical conductors to the external ground electrical conductor.

22. A protection apparatus according to claim 16 wherein said switch timing control means further comprises start-up timer means for switching said switching means to the protected state a predetermined time after said switching means is initially switched to the operating state and responsive to sensed power consumption indicating that the electrical equipment has not yet been turned on defining a start-up operating state for the protection apparatus.

23. A protection apparatus according to claim 22 further comprising start-up indicator means for providing an indication of whether the protection apparatus is in the start-up operating state.

24. A protection apparatus according to claim 16 further comprising state indicator means for providing an indication of whether said switching means is in the protected state or the operating state.

25. A protection apparatus according to claim 16 wherein said switch timing control means comprises a manually operable switch for permitting a user to initially switch said switching means to the operating state.

26. A protection apparatus according to claim 16 further comprising a remote control unit to be carried by the user; and wherein said switch timing control means further comprises a receiver for receiving a signal from said remote control unit for permitting the user to initially switch said switching means to the operating state.

27. A protection apparatus according to claim 26 wherein said remote control unit comprises a wireless hand held transmitter.

28. A protection apparatus according to claim 16 further comprising a plurality of electrical connectors operatively coupled to said switching means connectively receiving the external electrical conductors; and wherein said electrical connectors comprise at least one of an AC power connector, a DC power connector, a coaxial cable connector, a telephone line connector, and a data connector.

29. A protection apparatus according to claim 16 further comprising a housing associated with said switching means, said power consumption sensing means, and said switch timing control means.

30. A protection apparatus for protecting electrical equipment from an electrical disturbance carried by external electrical conductors connecting the electrical equipment to at least a source of electrical power, said protection apparatus comprising:

switching means being switchable between a protected state and an operating state, said switching means when in the protected state for isolating an equipment side of the external electrical conductors from a respective line side of the external electrical conductors, said switching means when in the operating state for connecting a line side of the external electrical conductors to a respective equipment side of the external electrical conductors;

power consumption sensing means for sensing electrical power consumption of the electrical equipment;

switch timing control means, operatively coupled to said switching means and said power consumption sensing means, for permitting a user to switch said switching means to the operating state, and for switching said switching means to the protected state responsive to sensed power consumption of the electrical equipment indicating nonuse of the electrical equipment to thereby protect the electrical equipment from disturbances carried by the external electrical conductors when the electrical equipment is not in use;

lightning sensing means for switching said switching means to the protected state responsive to sensing of lightning; and start-up timer means for switching said switching means to the protected state a predetermined time after said switching means is initially switched to the operating state and responsive to sensed power consumption indicating than the electrical equipment has not yet been turned on defining a start-up operating state for the protection apparatus.

31. A protection apparatus according to claim 30 further comprising power loss sensing means for sensing a loss of power from the power source and for switching said switching means immediately to the protected state responsive to sensing a loss of power.

32. A protection apparatus according to claim 30 wherein said switching means comprises shunting means for shunting an equipment side of the external electrical conductors together in the protected state.

33. A protection apparatus according to claim 32 wherein the external electrical conductors include an external ground electrical conductor; and wherein said switching means further comprises ground isolating means for isolating the shunted equipment side of the external electrical conductors from the external ground electrical conductor.

34. A protection apparatus according to claim 32 wherein the external electrical conductors include an external ground electrical conductor; and wherein said switching means further comprises ground connecting means for isolating the shunted equipment side of the external electrical conductors to the external ground electrical conductor.

35. A protection apparatus according to claim 30 further comprising start-up indicator means for providing an indication of whether the protection apparatus is in the start-up operating state.

36. A protection apparatus according to claim 30 further comprising state indicator means for providing an indication of whether said switching means is in the protected state or the operating state.

37. A protection apparatus according to claim 30 wherein said switch timing control means comprises a manually operable switch for permitting a user to initially switch said switching means to the operating state.

38. A protection apparatus according to claim 30 further comprising a remote control unit to be carried by the user; and wherein said switch timing control means further comprises a receiver for receiving a signal from said remote control unit for permitting the user to initially switch said switching means to the operating state.

39. A protection apparatus according to claim 38 wherein said remote control unit comprises a wireless hand held transmitter.

40. A protection apparatus according to claim 30 further comprising a plurality of electrical connectors operatively coupled to said switching means for connectively receiving the external electrical conductors; and wherein said electrical connectors comprise at least one of an AC power connector, a DC power connector, a coaxial cable connector, a telephone line connector, and a data connector.

41. A protection apparatus according to claim 30 further comprising a housing associated with said switching means, said power consumption sensing means, and said switch timing control means.

42. A protection apparatus for protecting electrical equipment from an electrical disturbance carried by external electrical conductors connecting the electrical equipment to at least a source of electrical power, said protection apparatus comprising:

switching means being switchable between a protected state and an operating state, said switching means when in the protected state for isolating an equipment side of the external electrical conductors from a respective line side of the external electrical conductors, said switching means when in the operating state for connecting a line side of the external electrical conductors to a respective equipment side of the external electrical conductors, said switching means comprising shunting means for shunting an equipment side of the external electrical conductors together in the protected state, and ground isolating means for isolating the shunted equipment side of the external electrical conductors from an external ground electrical conductor; power consumption sensing means for sensing electrical power consumption of the electrical equipment; and switch timing control means, operatively coupled to said switching means and said power consumption sensing means, for permitting a user to switch said switching means to the operating state, and for switching said switching means to the protected state responsive to sensed power consumption of the electrical equipment indicating nonuse of the electrical equipment to thereby protect the electrical equipment from disturbances carried by the external electrical conductors when the electrical equipment is not in use.

43. A protection apparatus according to claim 42 further comprising lightning sensing means for switching said switching means to the protected state responsive to sensing of lightning.

44. A protection apparatus according to claim 42 further comprising power loss sensing means for sensing a loss of power from the power source and for switching said switching means immediately to the protected state responsive to sensing a loss of power.

45. A protection apparatus according to claim 42 wherein said switch timing control means further comprises start-up timer means for switching said switching means to the protected state a predetermined time after said switching means is initially switched to the operating state and responsive to sensed power consumption indicating that the electrical equipment has not yet been turned on defining a start-up operating state for the protection apparatus.

46. A protection apparatus according to claim 42 wherein said switch timing control means comprises a manually operable switch for permitting a user to initially switch said switching means to the operating state.

47. A protection apparatus according to claim 42 further comprising a remote control unit to be carried by the user; and wherein said switch timing control means further comprises a receiver for receiving a signal from said remote control unit for permitting the user to initially switch said switching means to the operating state.

48. A protection apparatus according to claim 42 further comprising a plurality of electrical connectors operatively coupled to said switching means for connectively receiving the external electrical conductors; and wherein said electrical connectors comprise at least one of an AC power connector, a DC power connector, a coaxial cable connector, a telephone line connector, and a data connector.

49. A protection apparatus according to claim 42 further comprising a housing associated with said switching means, said power consumption sensing means, and said switch timing control means.

50. A method for protecting electrical equipment from an electrical disturbance carried by external electrical conductors connecting the electrical equipment to at least a source of electrical power, said method comprising the steps of:

electrically connecting switching means to the external electrical conductors with the switching means being switchable between a protected state and an operating state, said switching means when in the protected state for isolating an equipment side of the external electrical conductors from a respective line side of the external electrical conductors, said switching means when in the operating state for connecting a line side of the external electrical conductors to a respective equipment side of the external electrical conductors;

sensing electrical power consumption of the electrical equipment; and permitting a user to initially switch said switching means to the operating state, and controlling said switching means so as to switch said switching means to the protected state after a predetermined time period after said switching means is initially switched to the operating state and responsive to sensed power consumption of the electrical equipment indicating nonuse of the electrical equipment to thereby protect the electrical equipment from disturbances carried by the external electrical conductors when the electrical equipment is not in use.

51. A method according to claim 50 further comprising the steps of: sensing for lightning, and switching said switching means to the protected state responsive to sensing of lightning.

52. A method according to claim 50 further comprising the steps of: sensing a loss of power from the power source, and switching said switching means immediately to the protected state responsive to sensing a loss of power.

53. A method according to claim 50 further comprising the step of shunting an equipment side of the external electrical conductors together when said switching means is in the protected state.

54. A method according to claim 53 further comprising the step of isolating the shunted equipment side of the external electrical conductors from an external ground electrical conductor.

55. A method according to claim 53 further comprising the step of connecting the shunted equipment side of the external electrical conductors to an external ground electrical conductor.

56. A method according to claim 50 further comprising the step of providing an indication of whether the protection apparatus is in the start-up operating state.

57. A method according to claim 50 further comprising the step of providing an indication of whether the protection apparatus is in the protected or operating state.

* * * * *